United States Patent [19]
Yoshida

[11] Patent Number: 5,785,386
[45] Date of Patent: Jul. 28, 1998

[54] ROTARY-CAM TYPE RECLINING DEVICE

[75] Inventor: Tomonori Yoshida, Yokohama, Japan

[73] Assignee: Ikeda Bussan Co., Ltd., Ayase, Japan

[21] Appl. No.: 746,343

[22] Filed: Nov. 8, 1996

[30] Foreign Application Priority Data

Nov. 8, 1995 [JP] Japan ................. 7-314702

[51] Int. Cl.$^6$ ........................... B60N 2/22
[52] U.S. Cl. ........................... 297/367
[58] Field of Search ............. 297/366–369, 297/378.12, 363–365; 475/162

[56] References Cited

U.S. PATENT DOCUMENTS

| | | | |
|---|---|---|---|
| 4,770,464 | 9/1988 | Pipon et al. | 297/367 |
| 4,789,205 | 12/1988 | Pipon et al. | 297/367 |
| 5,161,856 | 11/1992 | Nishino | 297/367 |
| 5,590,931 | 1/1997 | Fairrey et al. | 297/367 X |

FOREIGN PATENT DOCUMENTS 6-125821  5/1994  Japan .

*Primary Examiner*—Peter R. Brown
*Attorney, Agent, or Firm*—Foley & Lardner

[57] ABSTRACT

A rotary-cam type reclining device comprises a base fixedly connected to a seat cushion, a toothed arm fixedly connected to a seat back and rotatably supported on the base via a pivot, a toothed block slidably disposed between the base and the arm and having an outer toothed portion and a cam-contour surface and slidably guided by two parallel side walls of a recessed toothed-block guide defined in the base, a rotary cam for producing outward and inward sliding motions of the toothed block to mesh and unmesh the outer toothed portion of the toothed block with and from the inner toothed portion of the arm by a rotary motion of the cam, and an operating lever mechanically linked to the cam for producing the rotary motion of the cam. In a completely-locked state of the device, the toothed block is held at its outermost meshing position by way of three cam-connection points created between the cam-profile surface of the cam and the cam-contour surface of the toothed block for restricting or preventing the movement of the toothed block in all directions of the toothed block.

6 Claims, 7 Drawing Sheets

ROTARY-CAM TYPE RECLINING DEVICE

BACKGROUND OF THE INVENTION

1. Field of the Invention

The present invention relates to a rotary-cam type reclining device suitable for use in automobile reclining seats, and more specifically to a rotary-cam type seat reclining device which is locked or unlocked by way of a rotary motion of the rotary cam mechanically linked to a reclining lever to ensure the angulation of a seat back relative to a seat cushion.

2. Description of the Prior Art

Recently, there have been proposed and developed various rotary-cam type reclining devices. A typical rotary-cam type reclining device includes a base fixedly connected to a seat cushion and having a recessed portion formed with two opposing parallel side walls, an arm fixedly connected to a seat back and rotatably supported by the base, at least one toothed block slidably guided in the two opposing parallel side walls in the base, a reclining lever, and a rotary cam usually fixedly connected to the pivot shaft of the reclining lever and acting to mesh or unmesh the toothed block with or from the inner toothed portion of the arm by way of rotation of the rotary cam. FIGS. 7, 8A and 8B show a prior art rotary-cam type reclining device having a pair of diametrically opposing toothed blocks. As seen in FIG. 7, the conventional rotary-cam type reclining device comprises a base 1 fixedly connected to a seat cushion and having a recessed portion 10 formed with two parallel side walls 9a and 9b, an arm rotatably supported by the base 1 and fixedly connected to a seat back, a pair of toothed blocks 12A and 12B slidably accommodated in the recessed portion 10 and guided by the two opposing side walls 9a and 9b, and a rotary cam 16 fixedly connected to the pivot shaft 4 of a reclining lever (not shown) for meshing or unmeshing each of the toothed portions 13 of the toothed blocks 12A and 12B with or from the inner toothed portion 21a of the arm 2. Each of the toothed blocks 12A and 12B has a cam-contour surface facing a cam-profile surface of the rotary cam 16. The cam-contour surface is formed with a projected portion 14d which can be brought into cam-engagement with a projected cam portion 16d of the cam-profile surface of the rotary cam 16. Also, each of the toothed block has a groove-cut portion 14e, whereas the rotary cam 16 has a finger-tip like cam portion 16e. When the rotary cam rotates in its counterclockwise direction (viewing FIG. 7), the projected portion 14d of each toothed block is brought into engagement with the projected cam portion 16d of the rotary cam, and thus the toothed block pair (12A; 12B) moves to their maximum radial outward sliding positions, and as a result the outer toothed portions (13; 13) of the toothed blocks are brought into meshed-engagement with the respective inner toothed portions (21a; 21a) of the arm 2. As a consequence, the reclining device is held in a completely locked state in which the relative rotational-motion of the arm 2 to the base 1 is prevented by meshed-engagement between the toothed block pair (12A; 12B) and the arm 2. Conversely, when the rotary cam rotates in its clockwise direction (viewing FIG. 7), the finger-tip like cam portion 16e of the rotary cam 16 is brought into engagement with the groove-cut portion 14e of each of the toothed blocks (12A; 12B), the toothed block pair (12A; 12B) moves to their maximum radial inward sliding positions, and as a result the outer toothed portions (13; 13) of the toothed blocks are unmeshed from the respective inner toothed portions (21a; 21a) of the arm 2. As a consequence, the reclining device is held in an unlocked state in which the disengagement between the toothed block pair (12A; 12B) and the arm 2 permits the relative rotational-motion of the arm 2 to the base 1. The clockwise rotation of the rotary cam 16 results from the pull-up motion of the reclining lever, while the anti-clockwise rotation of the rotary cam 16 results from the releasing motion of the reclining lever. However, in case of the prior art rotary-cam type reclining device as shown in FIGS. 7, 8A and 8B, the locked state of the reclining device is mainly created or held by only one cam-connection point between the projected portion 14d of the cam-contour surface of the toothed block and the projected cam portion 16d of the cam-profile surface of the rotary cam. With the reclining device held at the locked state, if excessively large external force (or impact force) acts on the arm 2 in the clockwise direction of the arm, each of the toothed blocks 12A and 12B may be excessively loaded by an external force acting in the clockwise direction, as indicated by the arrow in FIGS. 8A and 8B. Under an excessively loaded condition of the toothed blocks 12A and 12B, for instance in case of the lower toothed block 12B the lowermost end 12c of the left-hand side wall 12a is locally pushed up by the left-hand side wall 9a of the recessed guide portion 10 and additionally the uppermost end 12d of the right-hand side wall 12b is locally pressed by the right-hand side wall 9b of the recessed guide portion 10, because the left-hand side wall 12a of the toothed block 12B is guided by the side wall 9a of the recessed portion whereas the right-hand side wall 12b of the toothed block 12B is guided by the side wall 9b of the toothed portion 12B. In FIG. 8A, the push-up force acting at the left-hand side wall 12a of the toothed block 12B is denoted by "Y1", whereas the pressure acting on the right-hand side wall 12b is denoted by "Y2". In consideration of a smooth sliding motion of each of the toothed blocks (12A; 12B) within the recessed guide portion 10, there is less friction between the two opposing left-hand side walls 9a and 12a in sliding-contact and between the two opposing right-hand side walls 9b and 12b in sliding-contact. Therefore, in the event that an excessively large bending moment created by the previously-noted two forces Y1 and Y2 is applied to the toothed block, the lower toothed block 12B tends to be easily deformed as shown in FIG. 8B owing to the less-friction contact between the respective opposing sliding surfaces. In more detail, as seen in FIG. 8B, the left-hand side wall portion 12a may be upwardly and inwardly deformed, and also the cam-contour surface of the toothed block 12B is in compression and the outer toothed portion 13 of the toothed block 12B is in expansion and will increase in length under such a bending moment. The uppermost end 12d of the toothed-block right-hand side wall tends to be strongly pressed on the side wall 9b of the recessed guide portion 10, while the lowermost end 12c of the toothed-block left-hand side wall tends to be strongly pressed on the side wall 9a. Thus, the lower toothed portion 12B itself tends to be deformed in such a manner as to incline in the clockwise direction. As a consequence, the excessive external force acting in the clockwise direction of the arm may create an undesired stress concentration at the strongly-pressed position between the left-hand side wall 9a and the lowermost end 12c of the toothed-block left-hand side wall 12a, and at the strongly-pressed position between the right-hand side wall 9b and the uppermost end 12d of the toothed-block right-hand side wall 12b, and at the engaged point between the projected portion 14d of the cam-contour surface and the projected cam portion 16d of the cam-profile surface. Also, there is a possibility that the deformed toothed blocks may induce deformation of the rotary cam 16. To avoid such undesired deformation of each toothed block and a rotary cam, it is necessary to properly increase a thickness in each of the side walls 9a and 9b of the recessed guide portion 10 of the base 1 and/or a thickness in each of the toothed blocks 12A and 12B, for the purpose of an increase in mechanical strength of the cam-connected section of the reclining device. Alternatively, for the purpose of enhancement of the mechanical strength, a material having a high mechanical strength such as a high-strength steel can be used. In consideration of both lightening of the entire weight of the device and reduction in production costs, the previously-noted two methods for the mechanical-strength enhancement is unpreferable.

SUMMARY OF THE INVENTION

Accordingly, it is an object of the invention to provide an improved rotary-cam type reclining device which avoids the foregoing disadvantages of the prior art.

It is another object of the invention to provide a rotary-cam type reclining device employing a base (fixedly connected to a seat cushion) and an arm (fixedly connected to a seat back) which device can provide a high mechanical strength of the device without changing a thickness in a recessed-guide side walls of the base and a thickness in a toothed block meshable with an inner toothed portion of the arm, in comparison with a prior-art rotary-cam type reclining device.

In order to accomplish the aforementioned and other objects of the invention, a rotary-cam type reclining device comprises a base fixedly connected to a seat cushion, and defining therein a recessed toothed-block guide, the recessed toothed-block guide having a pair of parallel side walls, an arm fixedly connected to a seat back and rotatably supported on the base, the arm having an inner toothed portion, a toothed block slidably disposed between the base and the arm and having an outer toothed portion on an outer periphery thereof and a cam-contour surface on an inner periphery thereof and being slidably guided by the side walls of the recessed toothed-block guide, a rotary cam for producing an outward sliding motion of the toothed block to mesh the outer toothed portion with the inner toothed portion by a rotary motion of the cam in a first rotational direction and for producing an inward sliding motion of the toothed block to unmesh the outer toothed portion from the inner toothed portion by a rotary motion of the cam in a second rotational direction opposing the first rotational direction, the cam having a cam-profile surface facing the cam-contour surface of the toothed block, and an operating lever mechanically linked to the cam for producing the rotary motion of the cam, wherein the cam and the toothed block have at least three cam-connection points in the cam-profile surface and the cam-contour surface for restricting a sliding motion of the toothed block in a direction parallel to the side walls and for restricting a movement of the toothed block in a direction perpendicular to the side walls, when the toothed block is held at an outermost sliding position at which the outer toothed portion is completely meshed with the inner toothed portion. Preferably, the cam-connection points may be created at a pair of sloped cam-edge portions provided at both ends of the cam-profile surface of the cam and at an intermediate cam-edge portion provided in the middle of the cam-profile surface of the cam. Each of the sloped cam-edge portions may be sloped substantially at an angle of 45° with respect to the direction parallel to the side walls for restricting a movement of the toothed block in both the direction parallel to the side walls and the direction perpendicular to the side walls when the toothed block is held at the outermost sliding position.

According to another aspect of the invention, a rotary-cam type reclining device comprises a base fixedly connected to a seat cushion, and defining therein a recessed toothed-block guide, the recessed toothed-block guide having a pair of parallel side walls, an arm fixedly connected to a seat back and rotatably supported on the base through a pivot shaft, the arm having an inner toothed portion, a plurality of toothed blocks slidably disposed between the base and the arm, each of the toothed blocks having an outer toothed portion on an outer periphery thereof and a cam-contour surface on an inner periphery thereof, and being slidably guided by the side walls of the recessed toothed-block guide, a rotary cam in cam-connection with the toothed blocks for producing a radially outward sliding motion of the toothed blocks to mesh the outer toothed portion with the inner toothed portion by a rotary motion of the cam in a first rotational direction and for producing a radially inward sliding motion of the toothed blocks to unmesh the outer toothed portion from the inner toothed portion by a rotary motion of the cam in a second rotational direction opposing the first rotational direction, the cam having a plurality of cam-profile surfaces respectively facing the associated cam-contour surfaces of the toothed blocks, and an operating lever mechanically linked to the cam for producing the rotary motion of the cam, wherein the cam and each of the toothed blocks have at least three cam-connection points in the cam-profile surface and the cam-contour surface for restricting a sliding motion of the toothed blocks in a direction parallel to the side walls and for restricting a movement of the toothed blocks in a direction perpendicular to the side walls, when the toothed blocks are held at an outermost sliding position at which the outer toothed portions are completely meshed with the associated inner toothed portions. It is preferable that the cam-profile surfaces of the cam are point-symmetrical with each other with respect to an axis of the pivot shaft.

DESCRIPTION OF THE PREFERRED EMBODIMENTS

Figure 1:
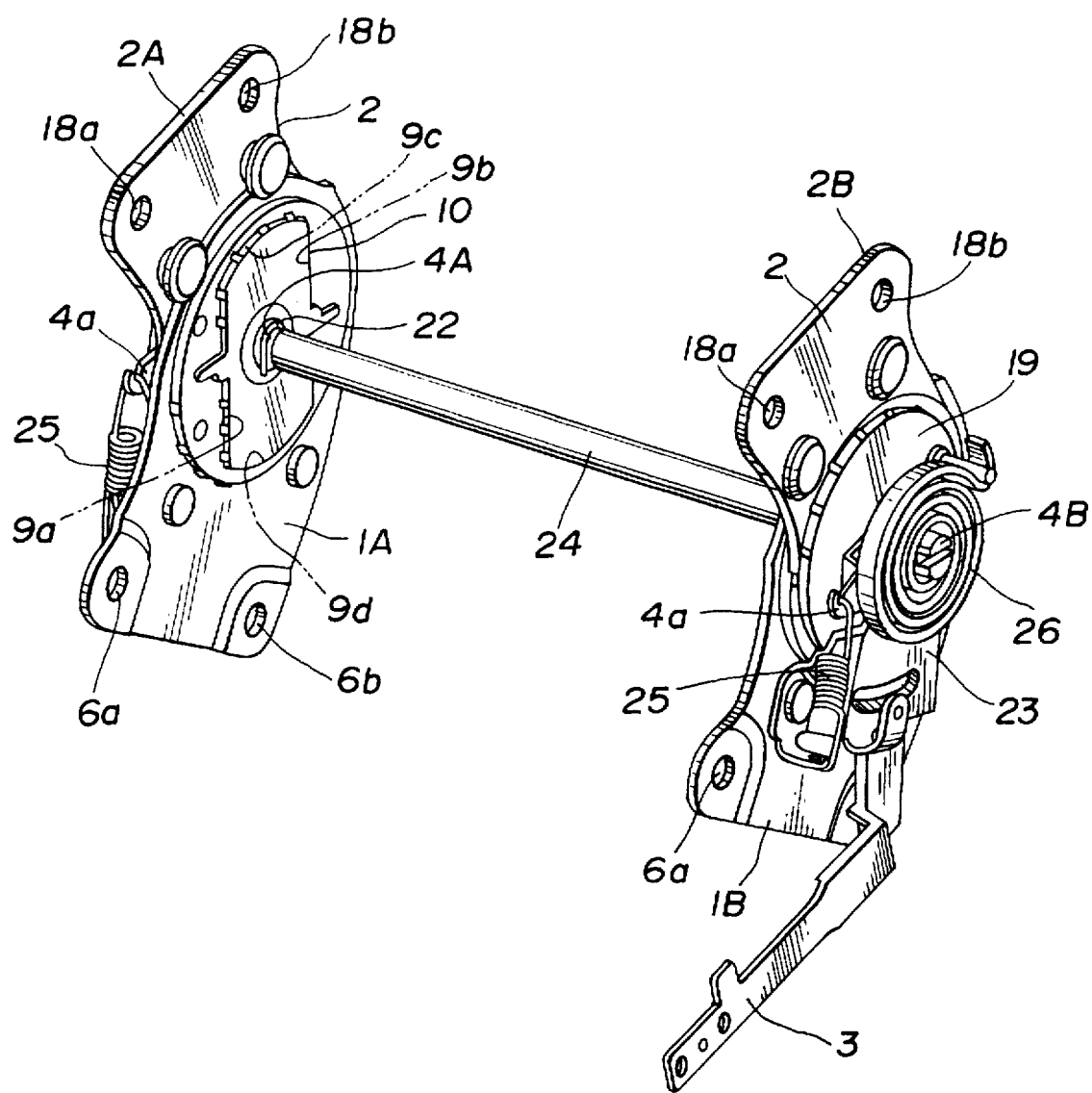
FIG. 1 is an assembled view illustrating one embodiment of a rotary-cam type reclining device made according to the invention.
Figure 2:
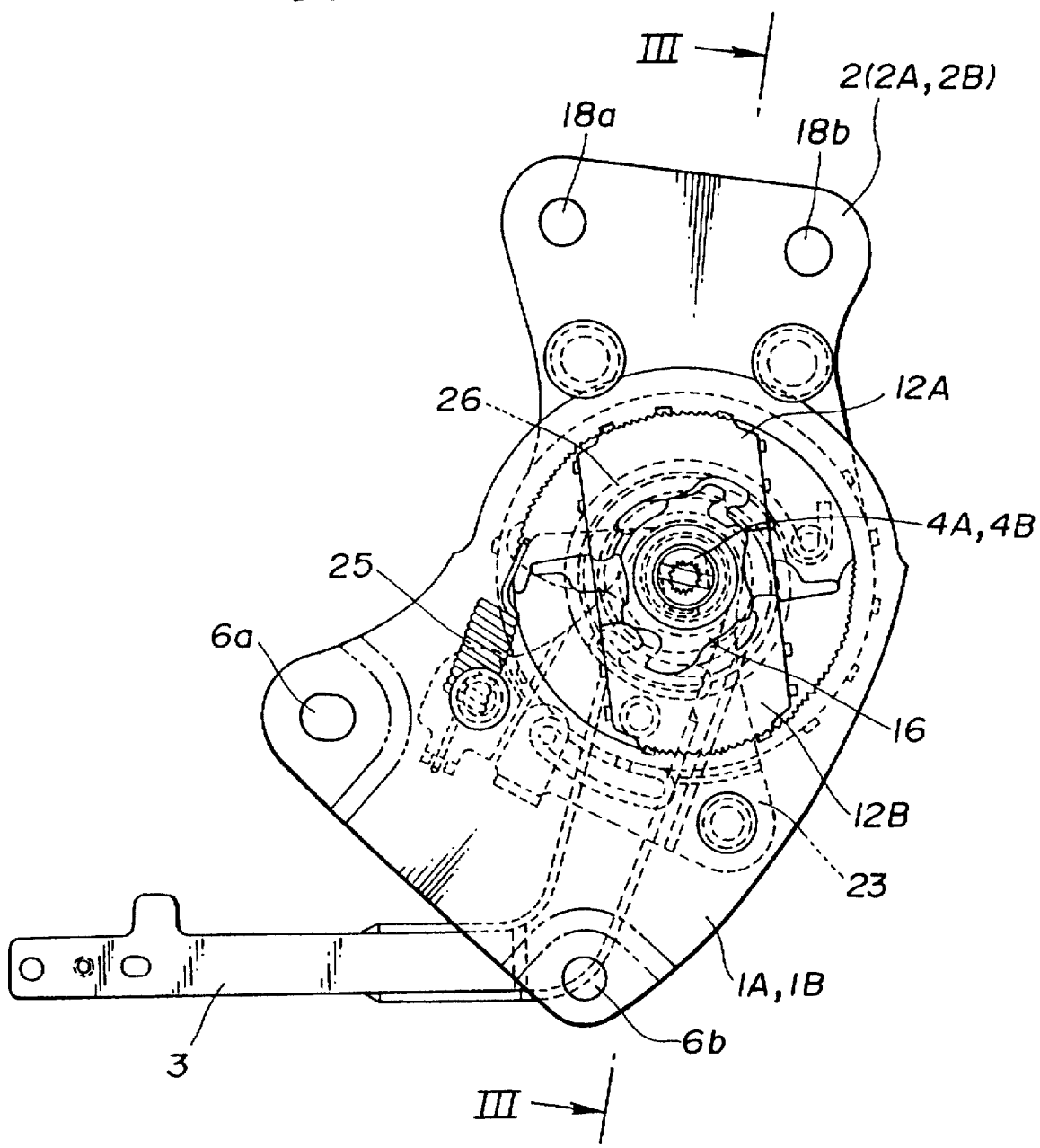
FIG. 2 is a side view illustrating the reclining device of the embodiment.

Referring now to the drawings, particularly to FIG. 1, the rotary-cam type reclining device of the invention is exemplified in case of a double-sided seat reclining apparatus. The basic construction of the rotary-cam type reclining device of the embodiment as shown in FIGS. 1 to 6 is similar to that of the prior art rotary-cam type reclining device shown in FIGS. 7 to 8B.

Figure 5A:
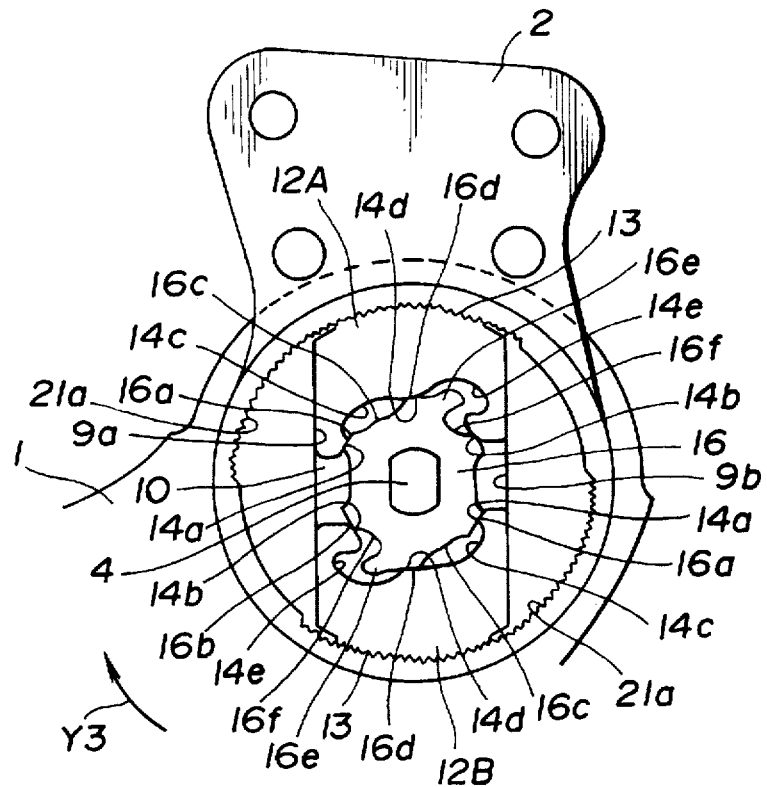
FIG. 5A is an explanatory view illustrating one engaged state of a rotary cam and a toothed-block pair in cam-connection and a locked state of the reclining device with the toothed-block pair meshed with the arm.
Figure 5B:
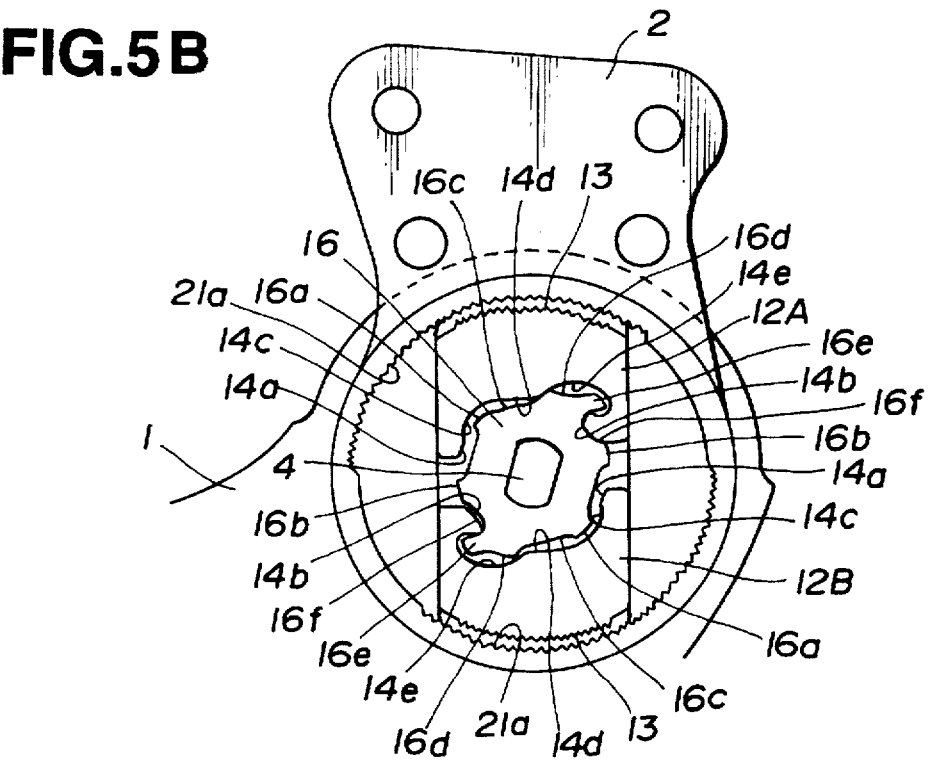
FIG. 5B is an explanatory view illustrating another engaged state of the rotary cam and the toothed-block pair in cam-connection and an unlocked state of the reclining device with the toothed-block pair unmeshed from the arm.
Figure 6:
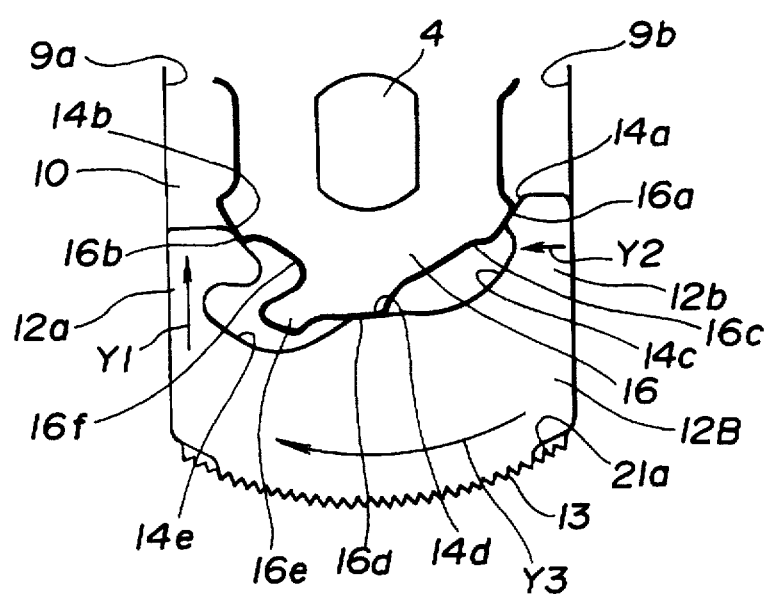
FIG. 6 is a partial enlarged view illustrating details of the cam-connection shown in FIG. 5A.
Figure 7:
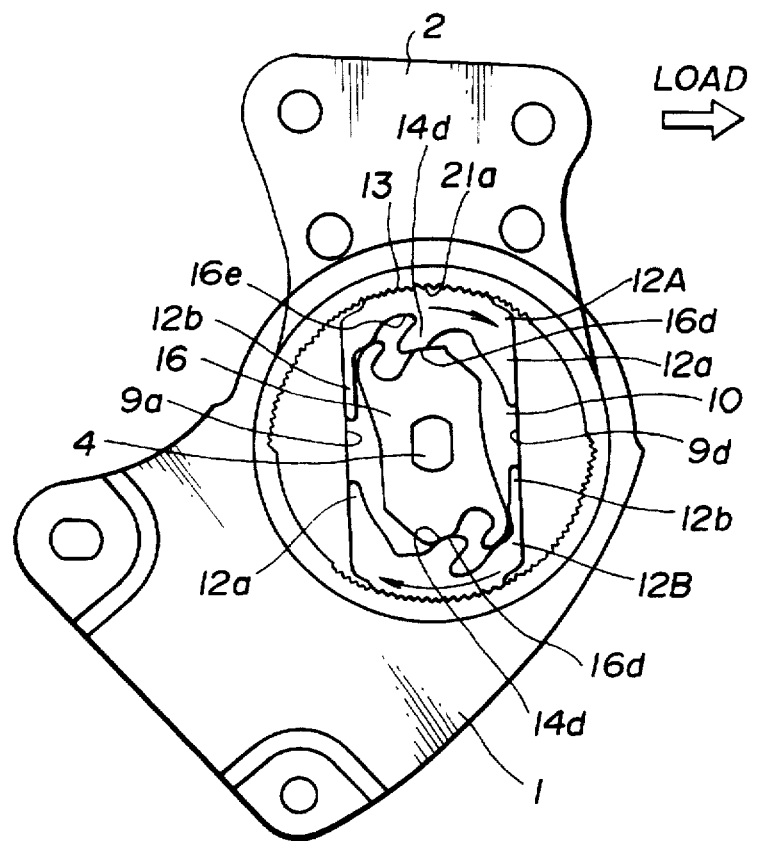
FIG. 7 is an explanatory view illustrating a locked state of a prior art rotary-cam type reclining device employing a pair of toothed blocks and a rotary cam.
Figure 8A:
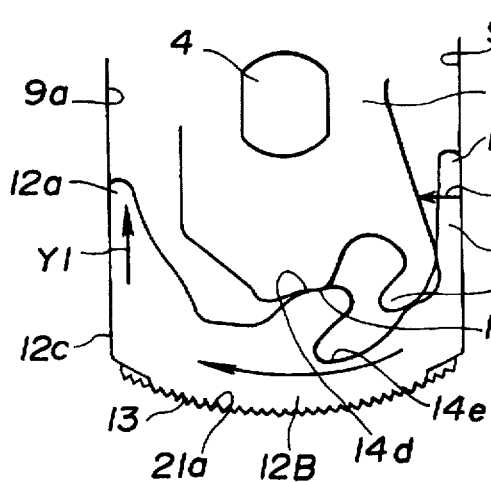
FIGS. 8A and 8B are explanatory views illustrating forces and a bending moment acting at the toothed block, resulting from an external force applied to the arm.
Figure 8B:
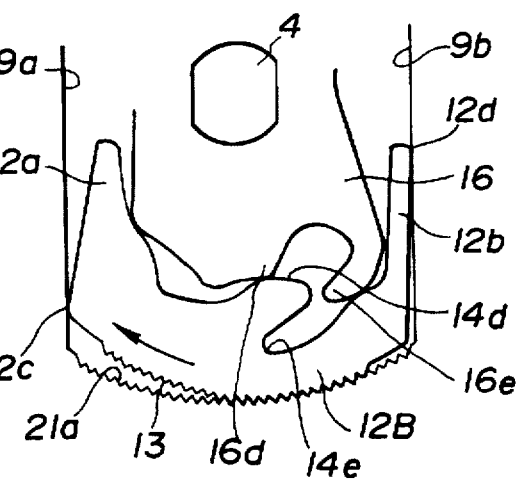

Therefore, the same reference numerals used in FIGS. 7 to 8B will be applied to the corresponding elements used in the embodiment of FIGS. 1 to 6, for the purpose of comparison.

Figure 3:
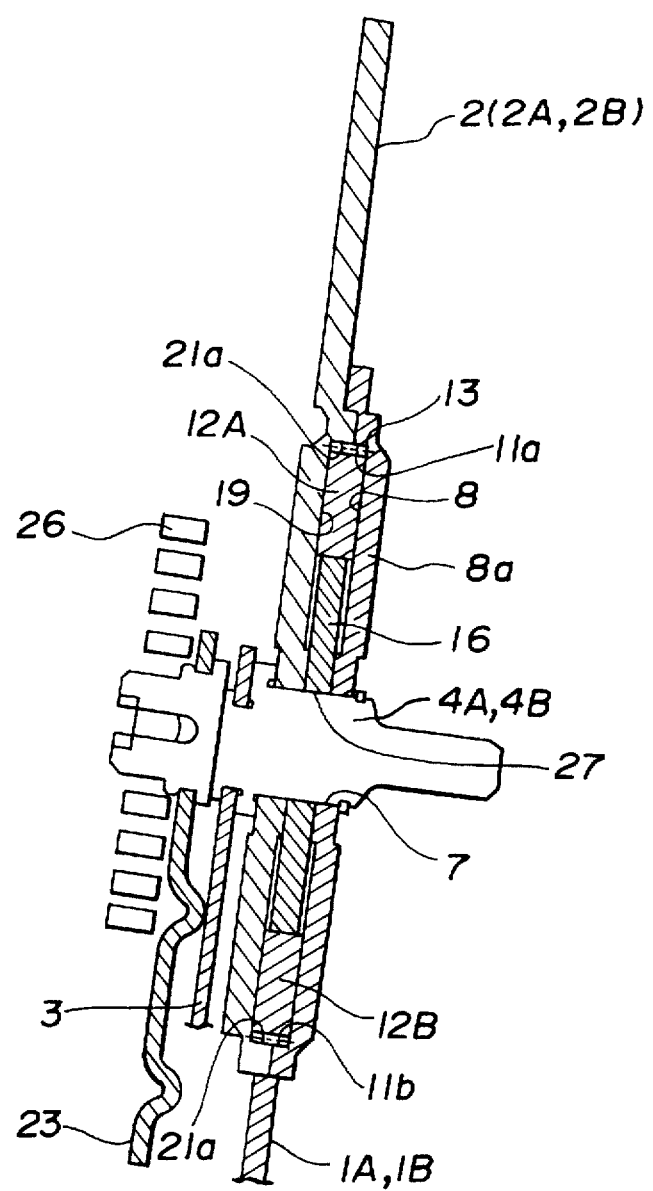
FIG. 3 is a cross-sectional view taken along the line A—A of FIG. 2.
Figure 4:
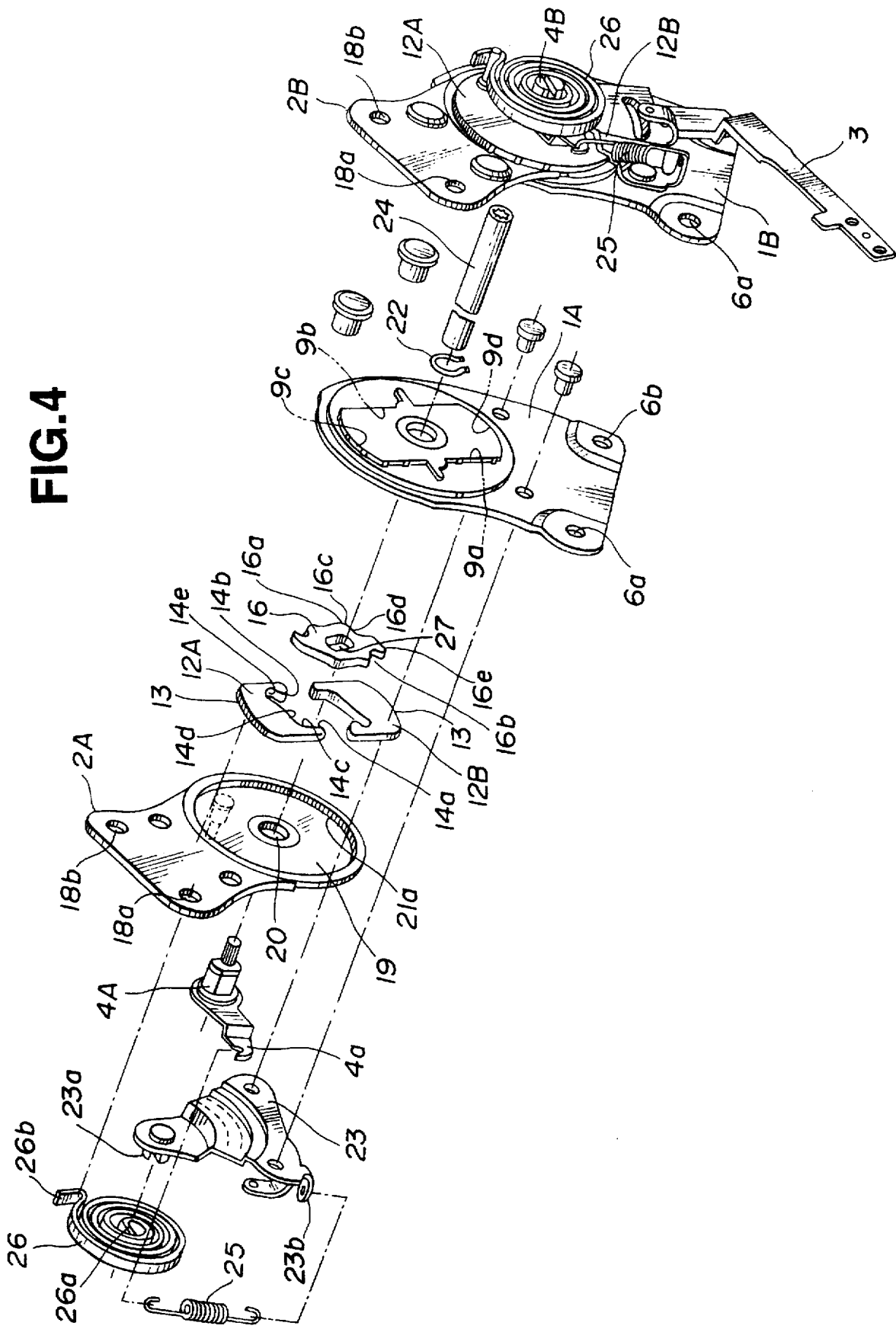
FIG. 4 is a dis-assembled view illustrating of the reclining device of embodiment.

Briefly speaking, the rotary-cam type reclining device of the embodiment is different from that of the prior art reclining device, in that a shape or geometry of the cam-contour surface of the toothed block (12A; 12B) and a shape or geometry of the cam-profile surface of the rotary cam 16 are both different from those of the prior art device. In FIG. 1, the right-hand side reclining device with a reclining-lever handle (simply reclining lever) 3 corresponds to an outside reclining device attached to the outside of a seat cushion (not shown) by means of a base 1B, the left-hand side reclining device corresponds to an inside reclining device attached to the inside of the seat cushion by means of a base 1A. The outside reclining device has an outside rotatable arm 2B fixedly connected to the outside of a seat back (not shown) and rotatably mounted on an outside pivot shaft 4B to which the reclining lever 3 is fixedly connected, whereas the inside reclining device has an inside rotatable arm 2A fixedly connected to the inside of the seat back and rotatably supported on an inside pivot shaft 4A. The two pivot shafts 4A and 4B are fixedly connected to each other through a connecting pipe 24 by way of serration or spline. As best seen in FIG. 4, the inside and outside bases 1A and 1B are symmetrical with each other in shape. As seen in FIG. 1, each of the bases 1A and 1B is formed with a plurality of mounting-bolt holes 6a and 6b for firmly securing the base to the seat-cushion frame by way of bolts or the like. Each of the bases (1A; 1B) is formed with a circular recessed portion 8 having a central bore 7 into which the associated pivot shaft (4A; 4B) is rotatably fitted. As shown in FIG. 3, a substantially rectangular recessed toothed-block guide 10 is formed essentially midway of the flat bottom plate 8a. The recessed toothed-block guide 10 has a pair of diametrically-opposing elongated side walls 9a and 9b, an upper circular-arc shaped side wall 9c being continuous with upper ends of the side walls 9a and 9b, and a lower circular-arc shaped side wall 9d being continuous with lower ends of the side walls 9a and 9b. As seen in FIG. 3, the upper circular-arc shaped side wall 9c is formed with an inner toothed portion 11a which is meshable with the outer toothed portion 13 of the upper toothed block 12A, whereas the lower circular-arc shaped side wall 9d is formed with an inner toothed portion 11b which is meshable with the outer toothed portion 13 of the lower toothed block 12B. The upper and lower toothed blocks 12A and 12B are guided within the recessed toothed-block guide 10 radially slidably by way of the guide sidewalls 9a and 9b. In addition to the outer toothed portion 13, each of the toothed blocks 12A and 12B has a cam-contour surface generally denoted by 14. The cam-contour surface 14 is composed of a plurality of complicated cam-contour surface portions 14a to 14e as fully described in later. When the rotary cam 16 and the toothed block pair (12A; 12B) are assembled within the recessed toothed-block guide 10 of the base, the cam-contour surface of the upper toothed block 12A and the cam-contour surface of the lower toothed block 12B are point-symmetrical with respect to the axis of the pivot shaft 4 (or the axis of the central bore 7). As seen in FIG. 4, the pivot shaft 4 has a pair of diametrically-opposing circular-arc faces and a pair of rectangular flat faces. Each of the circular arc faces serves as a sliding surface which is slidably fitted to the inner peripheral surface of the central bore 20 of the arm 2. For co-rotation with the pivot shaft 4 of the reclining lever, the substantially rectangular bore 27 of the rotary cam 16 is contoured in such a manner as to be precisely fitted onto the pivot shaft without any play. After each of the inside and outside pivot shafts 4A and 4B, which are represented by the reference numeral 4 as generally referred to, is fitted into the associated bore 7 (see FIG. 3) of the base while supporting hereon both the arm 2 and the rotary cam 16, a snap ring 22 is fitted on the free end of the pivot shaft 4 to prevent the axial movement of the pivot shaft 4 with respect to the base. As seen in FIGS. 4 to 6, the cam-contour surface of the toothed block (12A; 12B) is comprised of a substantially 45° up-sloped, raised edge portion 14a (see the rightmost end of the lower toothed block 12B of FIG. 6), a substantially 45° down-sloped, raised edge portion 14b (see the leftmost end of the lower toothed block 12B of FIG. 6), a first curved groove-cut portion 14c being continuous with the up-sloped raised edge portion 14a, a substantially straight, horizontally-extending intermediate portion 14d being continuous with the first curved groove-cut portion 14c, and a second curved groove-cut portion 14e being formed between the down-sloped raised edge portion 14b and the substantially straight, intermediate portion 14d. The rotary cam 16 is formed with a pair of diametrically-opposing cam-profile surfaces on its outer periphery such that the upper cam-profile surface of the rotary cam and the cam-contour surface of the upper toothed block 12A are in cam-connection, while the lower cam-profile surface of the rotary cam and the cam-contour surface of the lower toothed block 12B are in cam-connection. As best seen in FIG. 6, each cam-profile surface of the rotary cam 16 comprises a first sloped cam-edge portion 16a (see the rightmost end of the rotary cam 16 of FIG. 6), a second sloped cam-edge portion 16b (see the leftmost end of the rotary cam 16 of FIG. 6), an undulated cut-out portion 16c being continuous with the first sloped cam-edge portion 16a, a slightly-raised intermediate cam-edge portion 16d being continuous with the undulated cut-out portion 16c, a finger-tip like cam-edge portion 16e being continuous with the intermediate cam-edge portion 16d, and a curved groove-cut portion 16f formed between the second sloped cam-edge portion 16b and the finger-tip like cam-edge portion 16e. Returning to FIG. 4, the arm 2 is formed with a plurality of mounting-bolt holes 18a and 18b, for firmly securing the arm to the seat back (not shown). The arm 2 is formed integral with a ring-gear like portion 19 having a pair of diametrically-opposing circular-arc shaped inner toothed portions (21a; 21a), which are point-symmetrical with respect to the axis of the pivot shaft 4. When assembling, the pair of toothed blocks 12A and 12B are radially slidably accommodated in an internal space defined between the ring-gear like portion 19 of the arm 2 and the recessed toothed-block guide 10, so that the outer toothed portion 13 of each toothed block (12A; 12B) is meshable with the associated inner toothed portion 21a of the arm 2, and so that the rotary cam 16 is rotatably accommodated between the toothed blocks 12A and 12B. The ring-gear like portion 19 is so designed to have an inner diameter identical to an inner diameter of the diametrically-opposing curved side walls 9c and 9d. The inside pivot shaft assembly 4A is formed with an armed portion 4a. On the other hand, the outside pivot shaft assembly 4B is formed with an armed portion 4a as well as the reclining lever 3 integrally connected to the pivot shaft 4B, as shown in FIG. 1. As seen in FIG. 4, the armed portion 4a has a spring slot at which one hooked end of a return spring 25 such as a coiled tension spring is hanged. The other hooked end of the return spring 25 is hanged at a bracket 23b of a holder 23, fixedly connected to the associated base, usually by means of rivets. Therefore, the operating lever or the pivot shaft 4 is biased to its initial position or a spring-loaded position by way of the bias of the spring 25. The holder 23 is formed integral with a slotted shaft 23a. The slotted portion of the slotted shaft 23a is engaged with the innermost central end 26a of a return spring 26 such as a spiral spring. The outermost curled end 26b of the return spring 26 is engaged with a pin 28 fixedly connected to the arm. With the previously-noted arrangement, the seat back, fixedly connected to the arm, is permanently forced to tilt forwards by means of the bias of the spring 26 under the unlocked condition of the device. The rotary-cam type reclining device of the embodiment operates as follows.

Returning to FIG. 1, the reclining lever 3 (i.e., the inside and outside pivot shaft assemblies in rigid-connection by way of the connecting pipe 24) is normally biased to its initial position in the counter-clockwise direction (viewing FIG. 1) by way of the bias of the springs 25, and engaged with the holder 23 so that the maximum counter-clockwise rotational movement of the lever is restricted by way of the holder 23. Under such a released condition of the lever, as best seen in FIG. 5A, the first sloped cam-edge portion 16a, the second sloped cam-edge portion 16b and the slightly-raised intermediate cam-edge portion 16d of the cam-profile surface of the rotary cam are respectively engaged with and in cam-contact with the up-sloped raised edge portion 14a, the down-sloped raised edge portion 14b and the substantially-straight intermediate portion 14d of the cam-contour surface of each of the upper and lower toothed blocks 12A and 12B, by way of the anti-clockwise rotation of the pivot shafts 4A and 4B. Owing to the counter-clockwise rotation of the pivot shafts, the upper and lower toothed blocks 12A and 12B move radially outwardly, while being guided by the two parallel side walls 9a and 9b within the recessed toothed-block guide 10. Thus, the outer toothed portions 13 of the toothed block pair (12A; 12B) are brought into meshed-engagement with the respective inner toothed portions (21a; 21a) of the arm and also with the respective inner toothed portions 11a and 11b of the base. With the reclining lever 3 and the pivot shafts 4A and 4B held at their initial positions, the reclining device is held in its completely-locked state in which the relative rotational motion of the arm to the base is prevented by meshed-engagement between the toothed-block pair (12A; 12B) and the arm 2. Under the previously-noted completely-locked state of the reclining device, the two opposing side walls 12a and 12b of each of the toothed blocks 12A and 12B is slidably fitted to the respective side walls 9a and 9b of the recessed toothed-block guide 10 in addition to the meshed-engagement between the outer toothed portions (13; 13) and the inner toothed portions (21a; 21a) of the arm and the meshed-engagement between the outer toothed portions (13; 13) and the inner toothed portions (11a; 11b) of the base. In contrast with the above, for the purpose of shift from the completely-locked state to the unlocked state, if the reclining lever 3 is pulled up and rotated in its clockwise direction against the spring bias, the rotary cam 16 rotates clockwise as seen in FIG. 5B. The clockwise rotation of the rotary cam 16 causes the first sloped cam-edge portion 16a, the second sloped cam-edge portion 16b and the slightly-raised intermediate cam-edge portion 16d of the cam-profile surface of the rotary cam 16 to be dis-engaged from the up-sloped raised edge portion 14a, the down-sloped raised edge portion 14b and the substantially-straight intermediate portion 14d of the cam-contour surface of each of the toothed blocks 12A and 12B. Then, the arm 2 becomes rotated anti-clockwise, because the arm is permanently forced to the anti-clockwise direction by means of the bias of the return spring 26. In conjunction with the clockwise rotation of the rotary cam 16, such an anti-clockwise rotational motion of the arm 2 produces a radially inward sliding motion or a contracted motion of the toothed-block pair (12A; 12B). In this manner, the outer toothed portions 13 of the toothed-block pair are unmeshed from the inner toothed portions (21a; 21a) of the arm 2 and from the inner toothed portions 11a and 11b of the base 1 by way of the clockwise rotation of the lever. This unmeshed state corresponds to the unlocked state of the reclining device. Under these conditions, the seat back can be adjusted toward a desired angular position. When the lever 3 is returned to the spring-loaded position with the seat back adjusted at the desired angular position, the rotary cam 16 rotates counter-clockwise together with the lever. As a result, the toothed blocks 12A and 12B become slid radially outwards, and thus the outer toothed portions (13; 13) of the toothed blocks 12A and 12B are brought again into meshed-engagement with the inner toothed portions (21a; 21a) of the arm and with the inner toothed portions 11a and 11b of the base. In this manner, the angular adjustment of the seat back can be attained.

Under the locked condition of the reclining device, assuming that the vehicle, employing a reclining seat with the reclining device of the embodiment, experiences a severe collision and thus the seat back of the reclining seat is excessively loaded rearwards by excessive impact force, the arm 2 is forced to the clockwise direction. Such an excessively large torque applied to the arm is transmitted through the inner toothed portions (21a; 21a) of the arm to the outer toothed portions (13; 13) of the toothed-block pair (12A; 12B). As a consequence, as seen in FIG. 6, a clockwise rotational-force or a moment denoted by Y3 acts on each of the toothed blocks 12A and 12B. With the toothed block pair subjected to the excessive force Y3, in case of the lower half of the rotary cam as shown in FIG. 6, the force Y3 can be received by three cam-connection points (or three contact points) in addition to the two fitted side wall pairs (9a,12a; 9b,12b) and the meshed engaging pair (13, 21a; 13, 11b). The three cam-connection points correspond to an engaged point between the up-sloped raised edge portion 14a and the first sloped cam-edge portion 16a in cam-connection, an engaged point between the down-sloped raised edge portion 14b and the second sloped cam-edge portion 16b in cam-connection and an engaged point between the substantially-straight intermediate portion 14d and the slightly-raised intermediate cam-edge portion 16d in cam-connection. The engagement between the down-sloped raised edge portion 14b and the second sloped cam-edge portion 16b functions to prevent upward deformation as well as inward deformation of the left-hand side wall 12a of the toothed block. The engagement between the up-sloped raised portion 14a and the first sloped cam-edge portion 16a functions to prevent upward deformation as well as inward deformation of the right-hand side wall 12b of the toothed block. The engagement between the substantially-straight intermediate portion 14d and the slightly-raised intermediate cam-edge portion 16d functions to prevent upward deformation of the outer toothed portion 13 of the toothed block. In other words, under the excessively loaded condition such as an excessively large force Y3, the push-up force, Y1, acting on the left-hand side wall portion of the toothed block, is reliably received by the engaged point between the down-sloped raised edge portion 14b and the second sloped cam-edge portion 16b in cam-connection, the pressure Y2, acting on the right-hand side wall portion of the toothed block, is reliably received by the engaged point between the up-sloped raised edge portion 14a and the first sloped cam-edge portion 16a in cam-connection, while the upward deformation of the outer toothed portion of the toothed block is reliably received by the engaged point between the substantially-straight intermediate portion 14d and the slight-raised intermediate cam-edge portion 16d in cam-connection. Briefly, the previously-discussed three cam-connection points are cooperative with each other to restrict or prevent the sliding motion of the toothed block (12A; 12B) in a direction parallel to the side walls and for preventing or restricting a movement of the toothed block (12A; 12B) in a direction perpendicular to the side walls, when the toothed block (12A; 12B) is held at an outermost sliding position at which the outer toothed portion (13; 13) is completely meshed with the inner toothed portion (21a; 21a). In the completely-locked state, the intermediate cam-connection point created by the substantially straight intermediate portion 14d and the slightly-raised cam-edge portion 16d is effective to restrict or prevent the movement of the toothed block mainly in the direction parallel to the side walls. On the other hand, the right-hand and left-hand cam-connection points, respectively created by the right-hand 45° sloped edge portion 14a and the first cam-edge portion 16a and by the left-hand 45° -sloped edge portion 14b and the second cam-edge portion 16b, are effective to restrict or prevent the movement of the toothed block in both the direction parallel to the side walls and the direction perpendicular to the side walls. The three cam-connection points can avoid undesired stress-concentration which may occur on the side walls 9a and 9b of the recessed toothed-block guide 10 in the presence of application of impact force. A force, applied to the cam owing to the impact force, is properly distributed into the three cam-connection points without concentrating in only the intermediate cam-connection point between the substantially straight intermediate portion 14d of the cam-contour surface and the slightly-raised intermediate cam-edge portion 16d of the cam-profile surface as shown in FIG. 7. Furthermore, the previously-described point-symmetrical arrangement of the rotary cam 16 and the toothed-block pair (12A; 12B) with respect to the axis of the pivot shaft 4 contributes to a proper distribution of forces acting on the cam and the toothed-block pair. The previously-noted three cam-connection points are cooperative to each other to ensure a higher mechanical strength of the reclining device irrespective of the use of the rotary cam having a thickness identical to a rotary cam employed in the prior art rotary-cam reclining device as shown in FIG. 7 or the use of the recessed toothed-block guide having a pair of side walls, each having a height identical to the height of the side wall of the recessed toothed-block guide of the prior art device as shown in FIG. 7. The so-called three-point cam-connection can enhance a reliability of the reclining device, and thus a safety of the reclining device can be also enhanced. As may be appreciated, the three-point cam-connection of the invention is superior to the one-point cam-connection of the prior art from the viewpoint of a mechanical strength, and thus it is possible to reduce a thickness of each of the side walls (9a; 9b) of the recessed toothed-block guide 10 to a minimum permissible value and consequently to thin a thickness of each of the bases (1A; 1B) while insuring a required safety level of the device. This may reduce total production costs of the device. Also, such a reduction in the thickness of the base may facilitate a machinability of the base or improve a formability of the base.

Although the reclining device of the embodiment has been discussed in case of a rotary-cam type reclining device employing a pair of diametrically-opposing two toothed blocks (12A; 12B) in cam-connection with a rotary cam, the structure of the rotary cam and the toothed blocks, made according to the invention, may be applied to a rotary-cam type reclining device with three or more toothed blocks provided between a rotary cam and an inner toothed portion of an arm, as disclosed in Japanese Patent Provisional Publication No. 6-125821 (corresponding to French Patent Application No. 91 02590 filed on Mar. 5, 1991).

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A rotary-cam type reclining device comprising:
   a base (1A; 1B) fixedly connected to a seat cushion, and defining therein a recessed toothed-block guide (10), said recessed toothed-block guide having a pair of parallel side walls (9a, 9b);
   an arm (2A; 2B) fixedly connected to a seat back and rotatably supported on said base, said arm having an inner toothed portion (21a; 21a);
   a toothed block (12A; 12B) slidably disposed between said base (1A; 1B) and said arm (2A; 2B), and having an outer toothed portion (13; 13) on an outer periphery thereof and a cam-contour surface (14a, 14b, 14c, 14d, 14e) on an inner periphery thereof, and being slidably guided by said side walls (9a, 9b) of said recessed toothed-block guide (10);
   a rotary cam (16) for producing an outward sliding motion of said toothed block (12A; 12B) to mesh said outer toothed portion (13; 13) with said inner toothed portion (21a; 21a) by a rotary motion of said cam (16) in a first rotational direction and for producing an inward sliding motion of said toothed block (12A; 12B) to unmesh said outer toothed portion (13; 13) from said inner toothed portion (21a; 21a) by a rotary motion of said cam (16) in a second rotational direction opposing said first rotational direction, said cam having a cam-profile surface (16a, 16b, 16c, 16d, 16e, 16f) facing said cam-contour surface of said toothed block (12A; 12B); and
   an operating lever (3) mechanically linked to said cam (16) for producing said rotary motion of said cam (16);
   wherein said cam (16) and said toothed block (12A; 12B) have at least three cam-connection points in said cam-profile surface and said cam-contour surface for restricting a sliding motion of said toothed block (12A; 12B) in a direction parallel to said side walls and for restricting a movement of said toothed block (12A; 12B) in a direction perpendicular to said side walls, when said toothed block (12A; 12B) is held at an outermost sliding position at which said outer toothed portion (13; 13) is completely meshed with said inner toothed portion (21a; 21a).

2. A rotary-cam type reclining device as set forth in claim 1, wherein said at least three cam-connection points are created at a pair of sloped cam-edge portions (16a, 16b)

provided at both ends of said cam-profile surface of said cam (16) and at an intermediate cam-edge portion (16d) provided in the middle of said cam-profile surface of said cam.

3. A rotary-cam type reclining device as set forth in claim 2, wherein each of said sloped cam-edge portions (16a, 16b) is sloped substantially at an angle of 45° with respect to the direction parallel to said side walls for restricting a movement of said toothed block (12A; 12B) in both the direction parallel to said side walls and the direction perpendicular to said side walls when said toothed block (12A; 12B) is held at said outermost sliding position.

4. A rotary-cam type reclining device comprising:

a base (1A; 1B) fixedly connected to a seat cushion, and defining therein a recessed toothed-block guide (10), said recessed toothed-block guide having a pair of parallel side walls (9a, 9b);

an arm (2A; 2B) fixedly connected to a seat back and rotatably supported on said base through a pivot shaft (4), said arm having an inner toothed portion (21a; 21a);

a plurality of toothed blocks (12A, 12B) slidably disposed between said base (1A; 1B) and said arm (2A; 2B), each of said toothed blocks having an outer toothed portion (13) on an outer periphery thereof and a cam-contour surface (14a, 14b, 14c, 14d, 14e) on an inner periphery thereof, and being slidably guided by said side walls (9a, 9b) of said recessed toothed-block guide (10);

a rotary cam (16) in cam-connection with said toothed blocks for producing a radially outward sliding motion of said toothed blocks (12A, 12B) to mesh said outer toothed portion (13; 13) with said inner toothed portion (21a; 21a) by a rotary motion of said cam (16) in a first rotational direction and for producing a radially inward sliding motion of said toothed blocks (12A, 12B) to unmesh said outer toothed portion (13; 13) from said inner toothed portion (21a; 21a) by a rotary motion of said cam (16) in a second rotational direction opposing said first rotational direction, said cam having a plurality of cam-profile surfaces (16a, 16b, 16c, 16d, 16e, 16f) respectively facing the associated cam-contour surfaces of said toothed blocks (12A, 12B); and an operating lever (3) mechanically linked to said cam (16) for producing said rotary motion of said cam (16);

wherein said cam (16) and each of said toothed blocks (12A, 12B) have at least three cam-connection points in said cam-profile surface and said cam-contour surface for restricting a sliding motion of said toothed blocks (12A, 12B) in a direction parallel to said side walls and for restricting a movement of said toothed blocks (12A, 12B) in a direction perpendicular to said side walls, when said toothed blocks (12A, 12B) are held at an outermost sliding position at which the outer toothed portions (13; 13) are completely meshed with the associated inner toothed portions (21a; 21a).

5. A rotary-cam type reclining device as set forth in claim 4, wherein said at least three cam-connection points are created at a pair of sloped cam-edge portions (16a, 16b) provided at both ends of each of said cam-profile surfaces of said cam (16) and at an intermediate cam-edge portion (16d) provided in the middle of each of said cam-profile surfaces of said cam.

6. A rotary-cam type reclining device as set forth in claim 5, wherein said cam-profile surfaces of said cam (16) are point-symmetrical with each other with respect to an axis of said pivot shaft (4).

* * * * *